Oct. 21, 1941.    G. H. WORRALL    2,259,849
INTERMITTENT FILM MOVEMENT MECHANISM
Filed Feb. 2, 1940
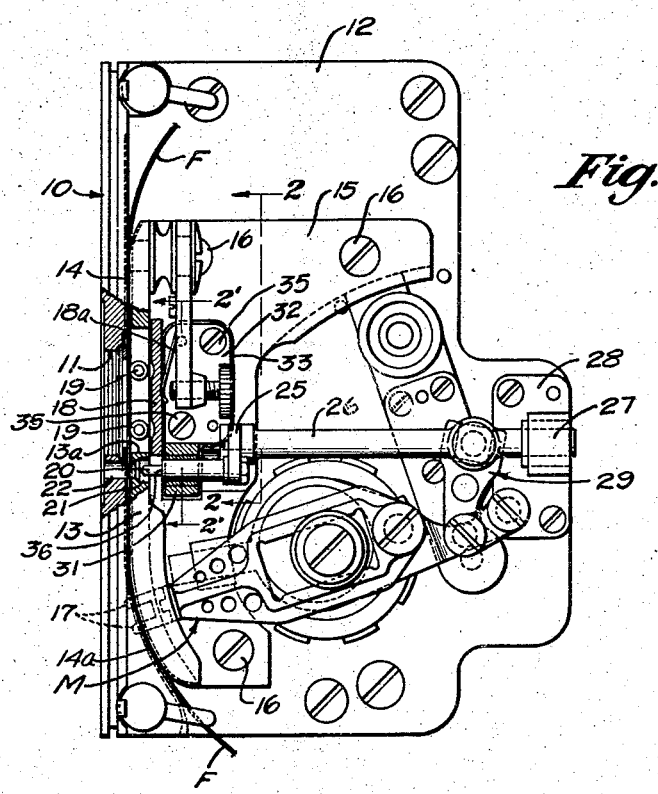
Inventor
George H. Worrall.
Attorneys.

Patented Oct. 21, 1941

2,259,849

UNITED STATES PATENT OFFICE 2,259,849

INTERMITTENT FILM MOVEMENT MECHANISM

George H. Worrall, Los Angeles, Calif., assignor to Mitchell Camera Corporation, West Hollywood, Calif., a corporation of Delaware Application February 2, 1940, Serial No. 316,978

2 Claims. (Cl. 88—18.4)

This invention relates generally to intermittent film movement mechanisms for motion picture cameras and the like, and more particularly to that type of intermittent film movement mechanism comprising film moving means having claw pins operable intermittently to engage the film perforations to pull down the film, and pilot pin mechanism comprising pilot pins engageable with the film perforations alternately with the claw pins to hold the film in proper register with the exposure aperture between times of movement by the claw pins. The present invention deals particularly with the pilot pin mechanism, and is concerned with improvements in the pilot pin guides or bearings.

In prior film movement mechanisms of the type with which the present invention is concerned, the pilot pins are on the forward ends of pilot pin studs, which are reciprocable through bearing bushings mounted in a film guide plate which defines the rearward side of the film race, the forward side of the latter being defined by the usual aperture plate. Considerable difficulty is encountered by reason of accumulation within these bushings of debris scraped off the film. The sawing action of the pilot pins on the edges of the film perforations produces a fine powder consisting of emulsion and fine Celluloid particles, and this debris is received within the bearing bushings through which the pilot pin studs reciprocate. This powder mixes with the oil that is present, forming an abrasive gummy substance that accumulates within the pilot pin bushings, and causing not only rapid wear, but frequent binding of the mechanism, making it necessary to disassemble the pilot pin bearings rather frequently for cleaning purposes.

The general object of the present invention is to provide an improved bearing arrangement for the pilot pin studs of an intermittent film movement mechanism, which is so designed as to prevent the emulsion and debris scraped from the film at the pilot pin area from working to and accumulating within the pilot pin bushings.

In accordance with the present invention, the bearing bushings for the pilot pin studs are spaced rearwardly from the film guide plate, and the film guide plate is provided with pilot pin apertures of sufficient size to pass freely the dust and debris coming from the film. This dust and debris is discharged from these apertures at the rearward side of the guide plate, but at points spaced forwardly of the forward ends of the pilot pin bushings, and thus falls harmlessly past the bushings.

The invention will be best understood from the following detailed description of a present preferred embodiment thereof, reference for this purpose being directed to the accompanying drawing, in which:

Fig. 1 is a side elevation of an intermittent film movement mechanism in accordance with the invention, parts being broken away as indicated by the line 1—1 of Fig. 2;

Fig. 2 is a section taken primarily on line 2—2 of Fig. 1, a portion of the bracket that supports the pilot pin bushings and a portion of the plate on which said bracket is mounted being, however, broken back to line 2'—2'; and Fig. 3 is a section taken on line 3—3 of Fig. 2.

In the drawing numeral 10 designates generally the usual vertical aperture plate having exposure aperture 11, and numeral 12 designates a vertical frame plate arranged at right angles to an edge of plate 10, plate 10 being secured to plate 12 in any suitable or usual manner. Spaced rearwardly from aperture plate 10 is a film guide plate 13, between which and aperture plate 10 is the race way 14 for the film F. Guide plate 13 has extending from its rearward edge a mounting plate 15 which abuts frame plate 12 and is secured thereto as by screws 16. The film guide way or race way 14 is vertically disposed except at its lower portion, where it is curved rearwardly, as indicated at 14a. A usual pressure pad 18 having film engaging rollers 19 is shown associated with an aperture 13a in guide plate 13, being held up to position by a spring 18a.

The film is intermittently advanced by any suitable claw mechanism, such as that designated at M. Since the details of this claw mechanism are not pertinent to the present invention, no detailed description will be given, though it may be stated that the movement mechanism illustrated is of the type disclosed in Patent No. 1,930,723 to George A. Mitchell. It will be understood that this intermittent film movement mechanism M is provided with claw pins 17 adapted to engage the perforations at opposite edges of the film F along the curved portion 14a of the film race way, being operable to engage the film perforations, then to move the film downwardly through a frame length, and then to withdraw from the film perforations and to move through a return stroke prior to reengaging the film perforations for the next pull down.

During the time in which the film is disengaged by the claw pins 17 of movement mechanism M the film perforations are engaged by pilot pins 20, the latter engaging the film perforations at points preferably located immediately below exposure aperture 11 and above the points of engagement by claw pins 17, in the general disposition indicated in the drawings. The pilot pins are so shaped as to fit nicely in the film perforations, and are reciprocable in a horizontal direction through apertures 21 in guide plate 13, aperture plate 10 being apertured as at 22 to receive the portions of the pins projecting forwardly of the film.

Pilot pins 20 project forwardly from enlarged pilot pin studs 24, and the latter are mounted at their rearward ends on a cross head 25 on the forward end of a horizontally reciprocable pilot pin operating shaft or carrier 26, studs 24 being provided with reduced screw threaded portions 24a projecting through cross-head 25 and provided with nuts 24b which secure them tightly to the cross-head. The rearward end portion of shaft 26 is slidable in a bearing 27 carried by a bracket 28 secured to frame plate 12, while shaft 26 is reciprocated in timed relation with the operation of film movement mechanism M by any suitable operative interconnection such as indicated at 29. For a more complete description of such an interconnection see the aforementioned Patent No. 1,930,723. Thus pilot pin shaft 26 is reciprocated to move the pilot pins between the two extreme positions shown in Figs. 1 and 3.

Pilot pin studs 24 are slidable in bearing bushings 30 mounted in a bracket 31 having a base portion 32 engaging and secured to main frame plate 12, plate 15 having an aperture 33 receiving base plate 32 with clearance, as illustrated in Fig. 1. Bracket base plate 32 is accurately positioned on main frame plate 12 by means of dowel pins 34 and is secured to said frame plate by means of screws 35. Bracket 31 and the forward ends of bushings 30 are spaced rearwardly from the rearward side of guide plate 13, as clearly shown in Fig. 3, and, in the preferred arrangement illustrated, the mounting for the bushings is removed entirely from guide plate 13 and placed directly on frame plate 12, thus avoiding surfaces over which dust or debris from pilot pin apertures 21 may readily work or creep to the entrance openings of the bearing bushings.

The spacing distance between guide plate 13 and the forward ends of bearing bushings 30 is preferably made sufficient that at the rearward limit of the stroke of the pilot pins, in which position the parts are illustrated in Fig. 1, the forward ends 36 of the enlarged pilot pin studs 24 are not withdrawn within the bearing bushings; in the illustrative embodiment herein illustrated, the forward ends of the pilot pin studs are actually slightly forward of the forward ends of the bushings at the rearward limit of the stroke, as clearly shown in Fig. 1. The purpose of this provision is to avoid the possibility of debris picked up by the surfaces of the pilot pin studs, and especially by their forward ends 36, from being carried within the bushing. If the pilot pin studs were retracted sufficiently far that their forward ends 36 entered within the pilot pin bushings, some of this debris would be carried within the forward end portions of the bushings; but by spacing the forward ends of the bushings sufficiently far back that the forward ends 36 of the pilot pin studs do not enter therewithin this does not occur.

The apertures 21 in guide plate 13 are sufficiently large as to provide a good clearance for the pilot pin studs and pilot pins, being enlarged at their rearward ends to accommodate freely the forward end portions of the studs, as indicated at 21a, and being of a size forwardly of the forward limit of travel of the pilot pin studs, that is, at 21b, such as accommodates, with the necessary clearance, the pilot pins 20. The clearances provided are such, as previously mentioned, as will freely pass the powdered scrapings from the film past the pins 20 and studs 24. This debris is discharged from the rearward ends of apertures 21, at points spaced well forwardly of the forward ends of the bushings, and falls harmlessly down the rearward side of guide plate 13. The result of the novel construction provided by the invention is that the inevitable debris scraped from the film by the sawing action of the pilot pins is effectively prevented from working and accumulating within the pilot pin bushings, with the entire elimination of the rapid wear on the pilot pin studs and bushings and the frequent binding and sticking of these parts that has previously been encountered.

It will be understood that the drawings and description are merely illustrative, and that various changes in design, structure and arrangement may be made without departing from the spirit and scope of the invention or of the appended claims.

I claim:

1. In an intermittent film movement mechanism having a vertical aperture plate, a vertical film guide plate spaced rearwardly from said aperture plate so as to form a film race between said plates, a vertical frame plate arranged at right angles to and supporting both said plates, and pilot pin mechanism embodying a pilot pin stud movable toward and from said film race; an aperture in said guide plate adapted to pass the forward end portion of said pilot pin stud with clearance, a bearing bushing bracket mounted cn said frame plate out of contact with said guide plate and located in a position spaced rearwardly from said guide plate, and a bearing bushing for said pilot pin stud mounted in said bracket, the forward end of said bushing being spaced rearwardly from said guide plate.

2. In an intermittent film movement mechanism having a vertical aperture plate, a vertical film guide plate spaced rearwardly from said aperture plate so as to form a film race between said plates, and pilot pin mechanism embodying a pilot pin stud movable between predetermined limits toward and from said film race, said stud comprising a cylindrical body and a pilot pin projecting from the forward end thereof, there being a forwardly facing shoulder at the juncture of said pilot pin with said cylindrical body; an aperture in said guide plate adapted to pass the forward portion of said pilot pin stud with clearance, and a bearing bushing for said pilot pin stud positioned with its forward end spaced rearwardly from said guide plate at least as far as the rearward limit movement of the forwardly facing shoulder on said pilot pin stud.

GEORGE H. WORRALL.